(12) United States Patent
Nemec

(10) Patent No.: US 8,834,081 B2
(45) Date of Patent: Sep. 16, 2014

(54) TABLE TOP BROACHING MACHINE

(75) Inventor: Kenneth B. Nemec, Leroy, MI (US)

(73) Assignee: American Broach & Machine, Co., Ypsilanti, MI (US)

( * ) Notice: Subject to any disclaimer, the term of this patent is extended or adjusted under 35 U.S.C. 154(b) by 1325 days.

(21) Appl. No.: 12/609,673

(22) Filed: Oct. 30, 2009

(65) Prior Publication Data

US 2011/0103913 A1 May 5, 2011

(51) Int. Cl.
*B23D 41/08* (2006.01)
*B23D 37/08* (2006.01)
*B23D 41/02* (2006.01)

(52) U.S. Cl.
CPC ............... *B23D 37/08* (2013.01); *B23D 41/02* (2013.01)
USPC ........................... 409/244; 409/254; 409/285

(58) Field of Classification Search
USPC .......... 409/249, 254, 259, 281, 285, 280, 244
See application file for complete search history.

(56) References Cited

U.S. PATENT DOCUMENTS

| | | | |
|---|---|---|---|
| 1,376,708 A | 5/1921 | Lapointe |
| 1,855,766 A | 4/1932 | Lapointe |
| 2,392,747 A | 1/1946 | Lapointe |
| 3,103,852 A | 9/1963 | Bonnafe |
| 3,550,504 A | 12/1970 | Fulks et al. |
| 6,409,442 B1 | 6/2002 | Berktold et al. |
| 6,568,890 B2 | 5/2003 | Gierth |

*Primary Examiner* — Christopher Besler
(74) *Attorney, Agent, or Firm* — Rader, Fishman & Grauer PLLC

(57) ABSTRACT

A table top broach machine comprising a table top; at least one support member positioned below and mounted to the table top; a drive mechanism operatively connected to at least one sealed drive spindle. The drive mechanism is positioned below the table top and configured to attach to at least one of the table top and the support member; and a base is positioned below and connected to the support member. The base is in fluid communication with and positioned below the table top.

18 Claims, 9 Drawing Sheets

TABLE TOP BROACHING MACHINE

TECHNICAL FIELD

The present disclosure relates to a table top broaching machine.

BACKGROUND

Broaching machines are large, bulky, framed structures that consume a large footprint of a factory floor. Broaching machines typically do not lend themselves to being efficient for lean manufacturing and the lower lot sizes associated with reduced work in process and one part flow manufacturing goals of smaller machine shops. Broaching machines are typically complicated and timely to set up and are intended for large production runs with repetitive part manufacturing.

Broaching machines, and in particular, vertical broaching machines, can be designed for push broaching, pull-down broaching, pull-up broaching or surface broaching. Known broaching machines require guides and have obstructed work surfaces. Vertical broaching machines may have cutting strokes that often exceed existing factory ceiling clearances. Allowing an operator to work at factory floor levels requires expensive pits to be dug, as the machines reach heights of twenty (20) feet or more. On a vertical pull-down broaching machine, the broaches are pulled from below a work table. In addition, vertical pull-down broaching machines may have hydraulic cylinders mounted vertically, extending up beyond the machine's work surface. Known broaching machines may be manufactured with large complicated cast frames surrounding at least one side of a working surface leaving the surface awkward and obstructed.

In known vertical broaching machines the work piece may be placed on a work surface that is dimensionally constrained due to the hydraulic cylinders protruding up and through the work surface. This work surface is limited in size, thus limiting the corresponding size of the work piece to the reduced dimensions of the table top free from the interference of the hydraulic cylinders. Therefore, there is a need in the machining industry for a vertical pull-down broaching machine having an obstruction free table top work surface while providing a design requiring minimal maintenance with fast and simple set up that consumes a small footprint in the machining shop floor.

DETAILED DESCRIPTION

Figure 1:
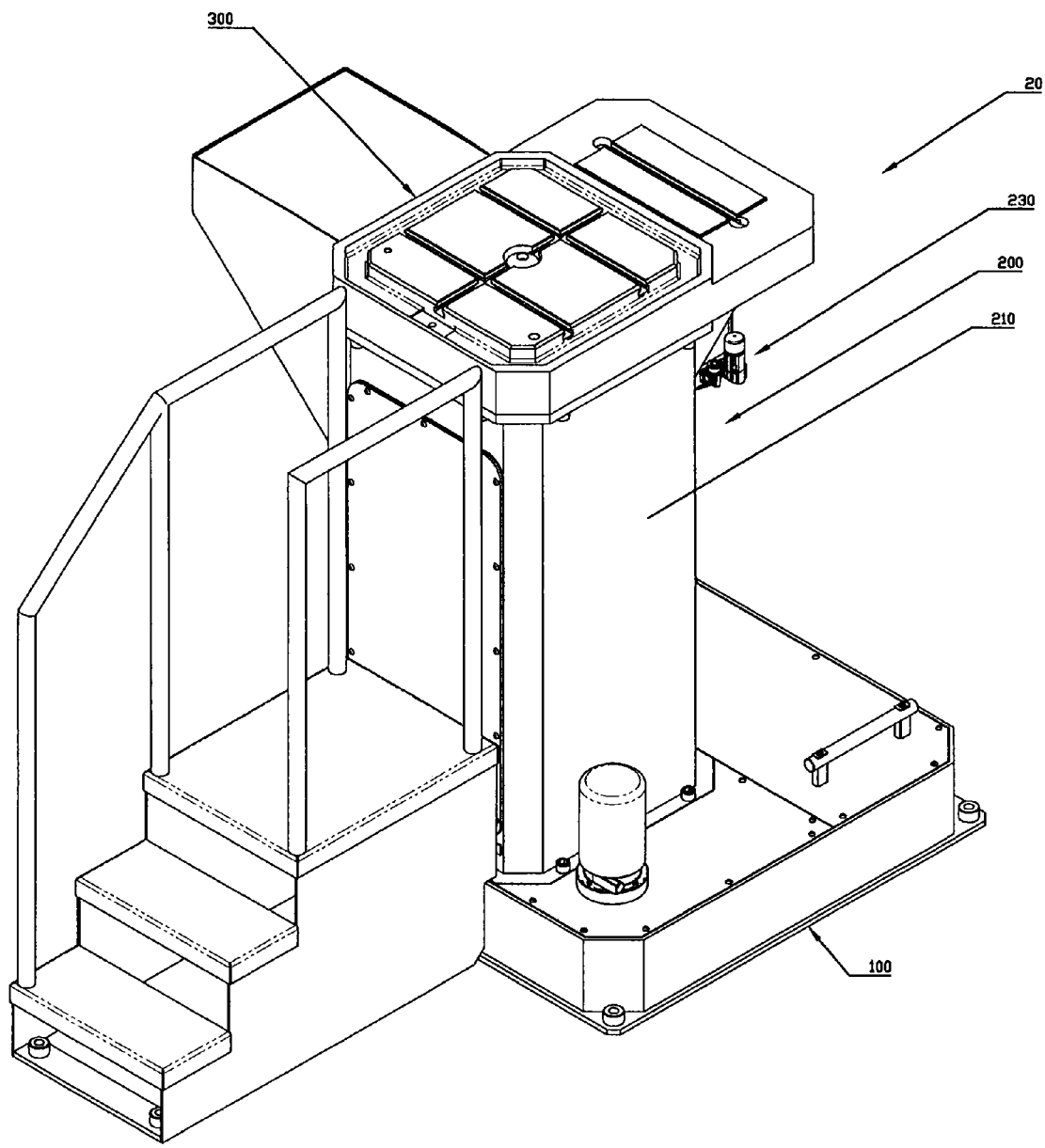
FIG. 1 illustrates a perspective view of an exemplary table top broaching machine.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions of the operational conditions associated with the disclosed system.

FIG. 1 illustrates an exemplary table top broaching machine assembly 20 including a table top 300, supported by and removably connected to a drive housing 200, which may be supported by and removably connected to a reservoir base 100. The reservoir base 100 provides the support of the broaching machine assembly 20 and may be removably affixed to a planar load bearing surface such as, a floor, table or other structure (not shown) capable of assuming and dispersing a load. The drive housing 200 may include at least two vertically extending supports 210, and may be interconnected to the reservoir base 100 and the table top 300. The supports 210 may be, but are not limited to, a wall or stanchion capable of supporting the table top 300 and interconnecting the table top 300 with the reservoir base 100 while providing support to a drive assembly 230.

Figure 2A:
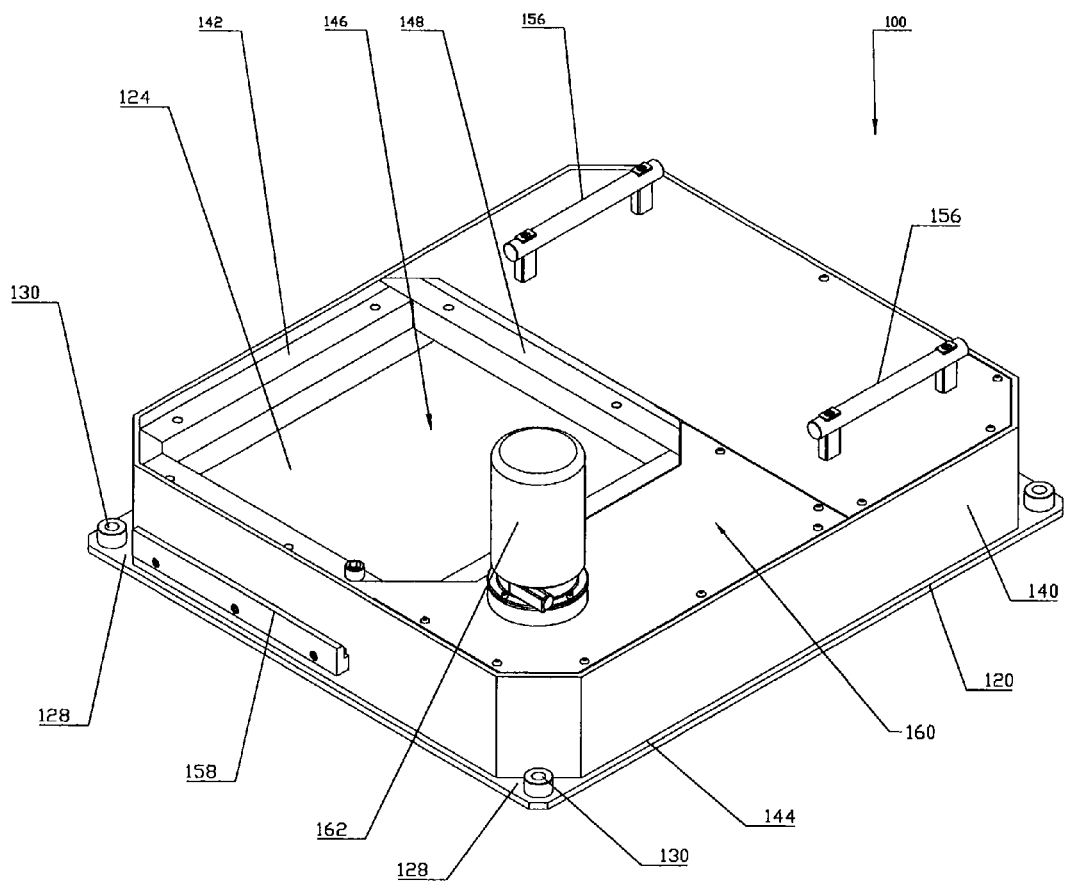
FIG. 2A illustrates a top perspective view of an exemplary table top broaching machine reservoir base.
Figure 2B:
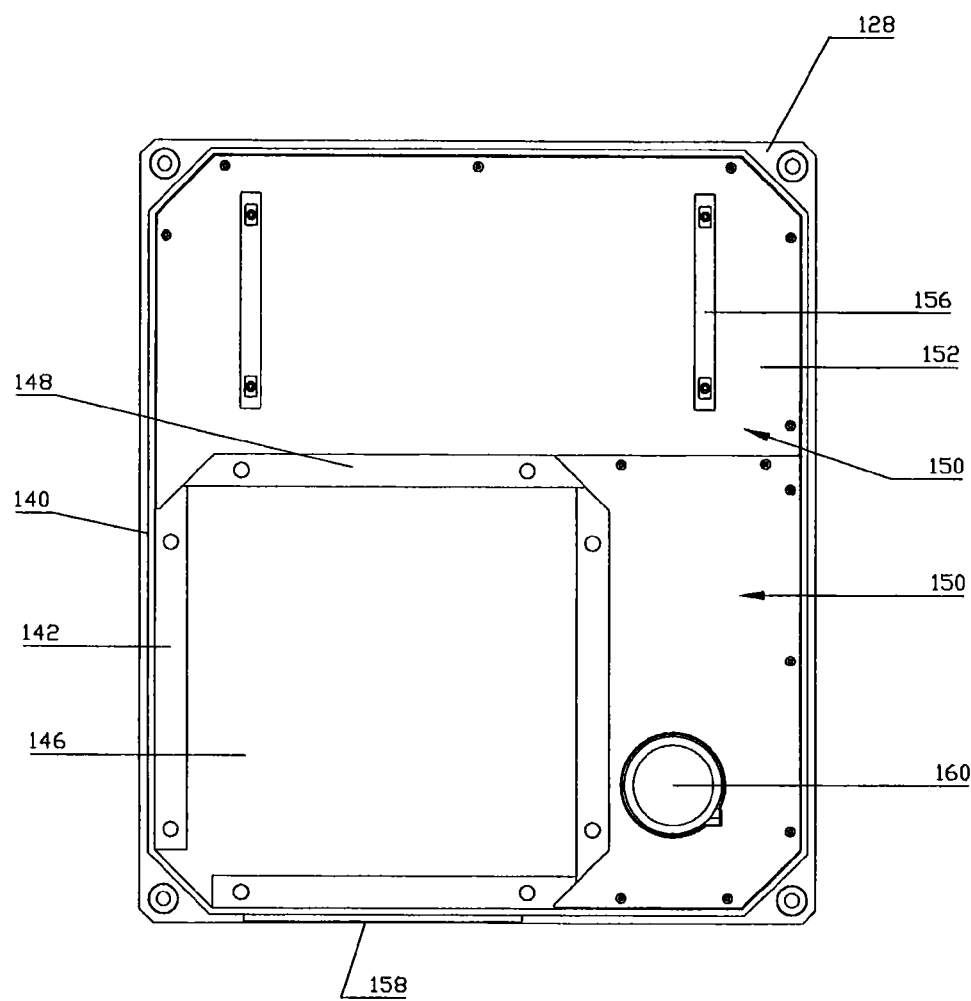
FIG. 2B illustrates a top view of an exemplary table top broaching machine reservoir base.
Figure 2C:
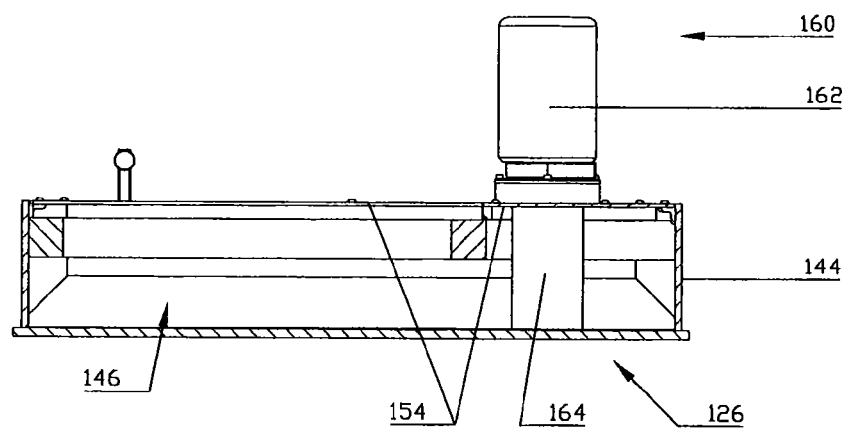
FIG. 2C illustrates a side section view of an exemplary table top broaching machine reservoir base.

FIGS. 2A-2C illustrate an exemplary table top broaching machine assembly 20 reservoir base 100 including a base plate 120, having a top surface 124 and a bottom surface 126, side walls 140, having a top edge 142 and a bottom edge 144, and at least one top access cover panel 150, having a top surface 152 and bottom surface 154. The base plate 120 provides a surface for the reservoir base 100 to be affixed to the floor or table (not shown) with mounting structures such as tabs 128. The exemplary mounting tabs 128 are structured to accept any known form of mechanical fastener 130, including, but not limited to, bolting, clamping or welding. The base plate 120 may be sealingly connected to a side wall bottom edge 144 to create a reservoir 146. The reservoir 146 may be structurally partitioned (not shown) to create multiple cavities (not shown) as well as supports 148 for the drive housing 200. Depending on the attachment method used, a seal (not shown) may be provided to aid in impeding the intrusion of and containment of a liquid or other flowable material. The liquid or flowable material may be used for cooling a broaching tool (not shown) and a metal workpiece (not shown) while washing away any metal chips formed during the broaching process.

As best seen in FIGS. 2A and 2B, the side wall top edge 142 extends around an outer periphery of the side walls 140. The top edge 142 provides a support lip for both the access cover panels 150 and the drive housing 200. The side wall top edge 142 is peripherally integral to the side wall 140; however, the top edge 142 may be a separate piece that is attached to the side wall 140. The top edge 142 may include at least one mounting device for removably attaching the drive housing 200 and the access cover panels 150. There may be multiple access cover panels 150; however, at least one cover panel 150 may have at least one handle 156 attached to the cover panel top surface 152 and at least one cover panel 150 may have at least one aperture (not shown) for mounting a pump 160. Additionally, at least one of the reservoir base side walls 140 may include mounting points 158 for attaching auxiliary components (not shown) such as, but not limited to, stairs and material handling devices.

The pump 160 may be either pneumatic or electrical and may include an auxiliary power source (not shown) to drive the pump. As illustrated in FIG. 2C, which is a sectional view along plane A-A of FIG. 2B, the pump may include a pump pickup 164 extending into the reservoir 146. The pump pickup 164 is in fluid communication with the liquid (not shown) and a fluid port 312 on the table top 300. The pump may also include a regulator 162 to vary the flow and pressure of the liquid. The pump power source (not shown) and regulator 362 may include auxiliary sensors that are monitored and controlled by an auxiliary control unit (not shown) that will be discussed in greater detail below.

Figure 3A:
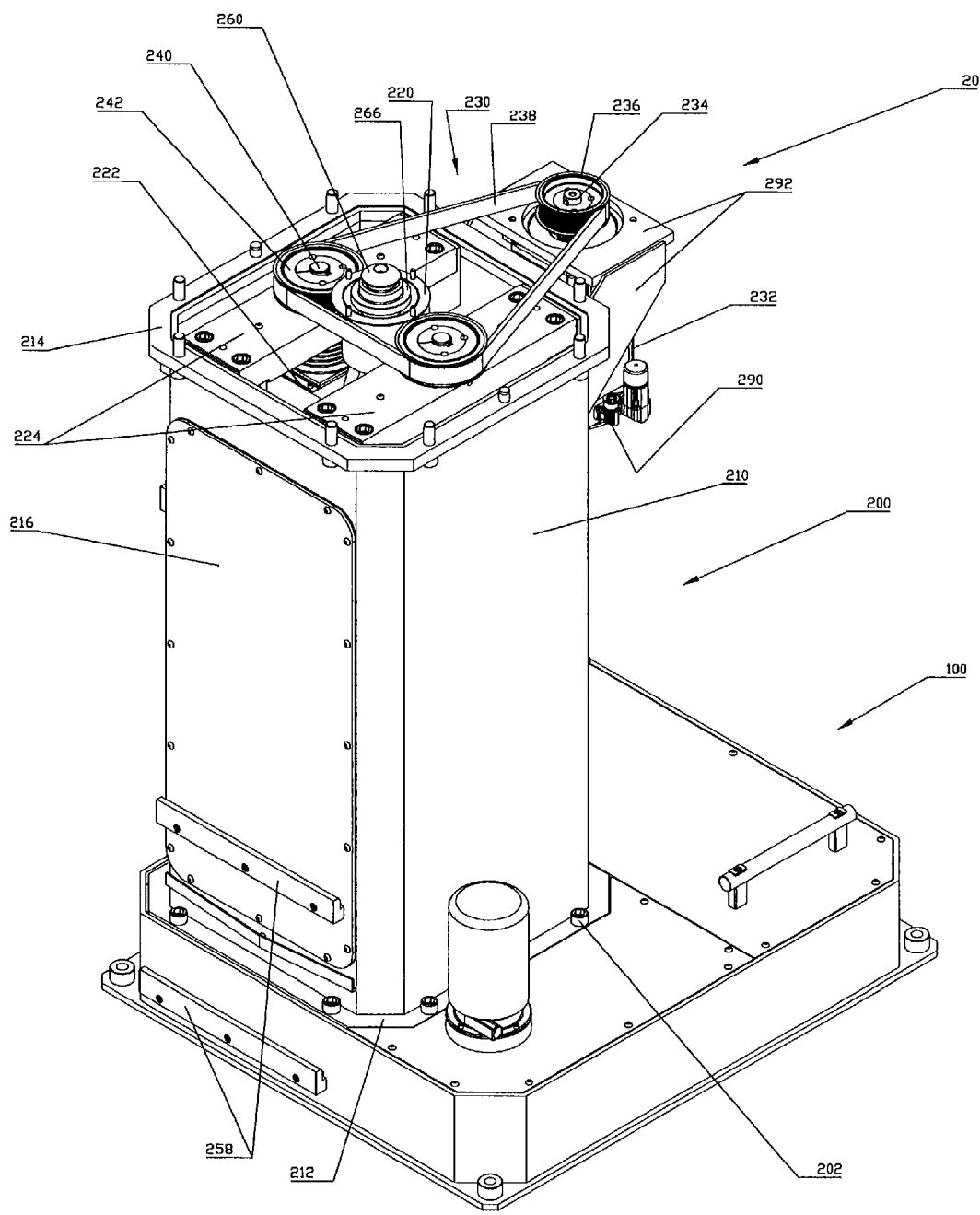
FIG. 3A illustrates a top perspective view of an exemplary table top broaching machine with table top removed.
Figure 3B:
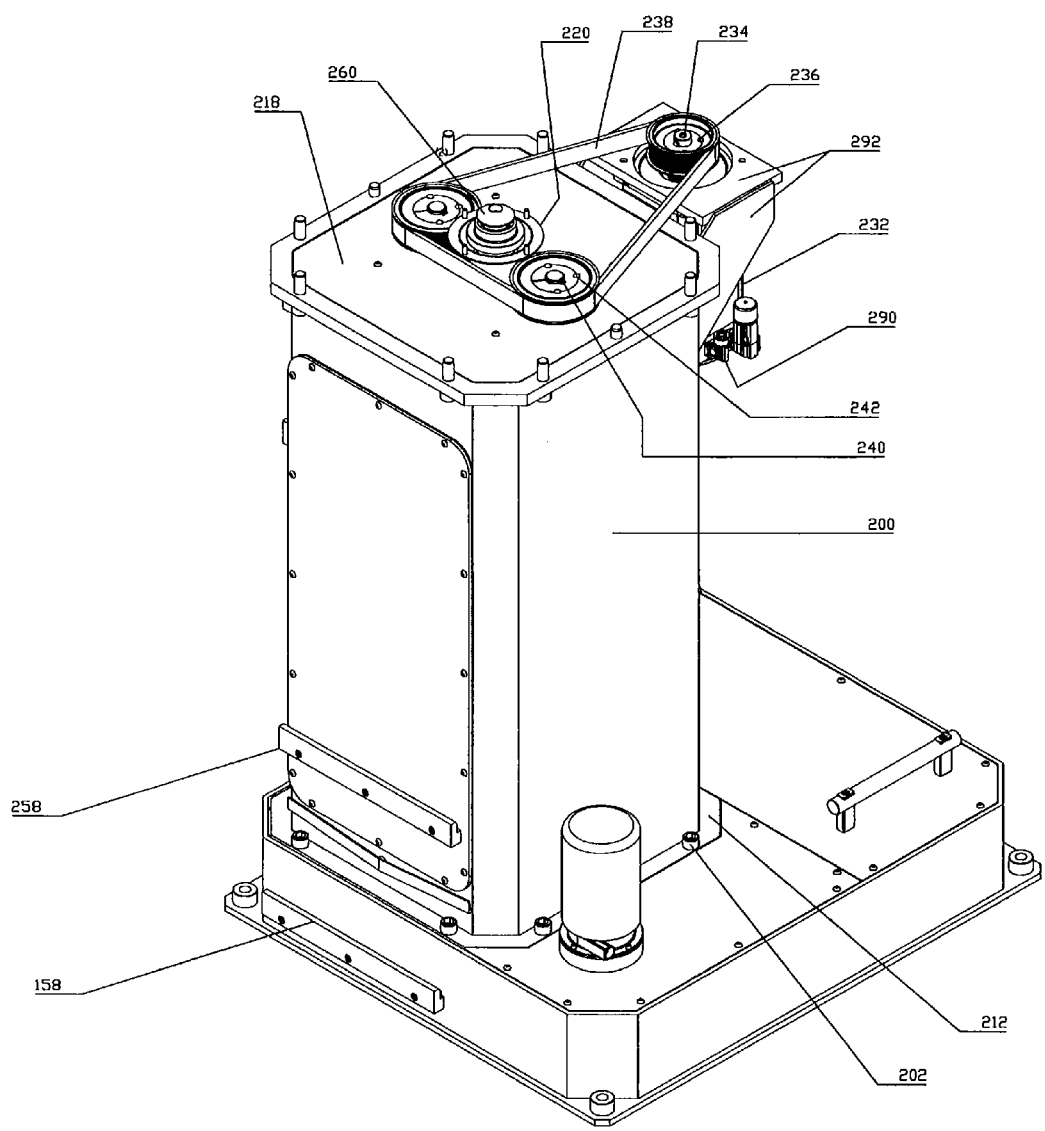
FIG. 3B illustrates a top perspective view of an exemplary table top broaching machine with table top removed and table top seal plate in place.

FIGS. 3A and 3B illustrate an exemplary table top broaching machine assembly 20 drive housing 200, the housing 200 includes a reservoir mounting lip 212 and a table top mounting lip 214. The drive housing 200 may be removably attached to the reservoir base 100 by standard mechanical fasteners 202. However, the drive housing 200 may be attached by other known mechanical fastening means such as, but not limited to toggles, welding, bolts, hinges, clamps or rivets. The drive housing 200 provides a support structure around the drive assembly 230 and protects the drive assembly 230 from damage or debris as well as providing a barrier between the moving parts of the drive assembly 230 and an operator (not shown). The drive housing 200 may have at least one side wall vertically extending support 210 that may be constructed from a load bearing material such as, but not limited to, steel, cast iron, aluminum or composite. Additionally, the drive housing 200 may include external mounting points 258 for attaching the auxiliary components (not shown) as stated above at 158 such as, but not limited to, stairs and material handling devices.

The drive housing 200 may include at least one access door 216 that is removably attached to at least one of the supports 210. The access door 216 provides an opening to the drive assembly 230 when vertically extending walls are used as the supports 210. A chip seal plate 218 and a chip funnel 220 may be used to help seal an internal area 222 of the drive housing 200 from debris and metal chips that are produced during the broaching process.

FIGS. 3A and 3B further illustrate a portion of the drive assembly 230 including, at least one drive unit 232 having at least one shaft 234 and at least one interconnected shaft drive pulley 236. The shaft drive pulley 236 may be rotatably connected to at least one drive spindle 240, having a spindle drive pulley 242, through a drive member 238. The drive spindle 240 may be positioned within the drive housing 200 utilizing an upper bearing block 224 and a lower bearing block 226. The bearing blocks 224, 226 may be permanently attached to the drive housing 200 or removably attached utilizing known mechanical connectors. The drive member 238 may be at least one of, but not limited to, a drive belt, drive chain or inter-meshing gear. The shaft drive pulley 236 and the spindle drive pulley 242 may be connected to the respective shaft or spindle by any known mechanical connection able to allow the transmission of torque such as, but not limited to, a key and key-way, a nut, a bolt and threaded attachment. The drive pulley 236 may be mechanically attached to a drive spindle 240, which may be interconnected to a pull bridge 250 and corresponding broaching tool puller 260.

The drive unit 232 may be one of an electrical, electro-mechanical, hydraulic or pneumatic drive motor. However, the use of an electro-mechanical drive unit 232 eliminates the cadence (pounding) associated with and resulting from the compression and expansion of the hydraulic oil as the cutting forces vary during the broaching process. The drive unit 232 may include a power source (not shown) and a position encoder 290. Both the power source and the position encoder 290 may be interconnected to the control unit (not shown). The connection to the control unit (not shown) helps the operator to know where the drive unit shaft 234 is and allow the drive unit shaft 234 and ultimately the connected broaching tool puller 260 to be taken to a home position during operation. The drive unit 232 may be of the uni-drive variety for providing both forward and reverse rotation in a single drive. The forward and reverse capability allows the operator to raise and lower the tool puller 260 for loading and unloading the workpiece on the table top 300.

The drive unit 232 may be removably attached to the outer surface of the drive housing 200 or to the table top 300 by a drive unit mounting bracket 292. The mounting bracket 292 may be mechanically connected to both the drive unit 232 and the drive housing 200 by at least one of, but not limited to, bolts, nuts, threaded connections, toggles and welds. The mounting bracket 292 may be made of at least one of, but not limited to, steel, cast iron, aluminum and composite. The mounting bracket 292 may be load bearing to support the drive unit 232 as well as a portion of the table top 300.

Figure 4A:
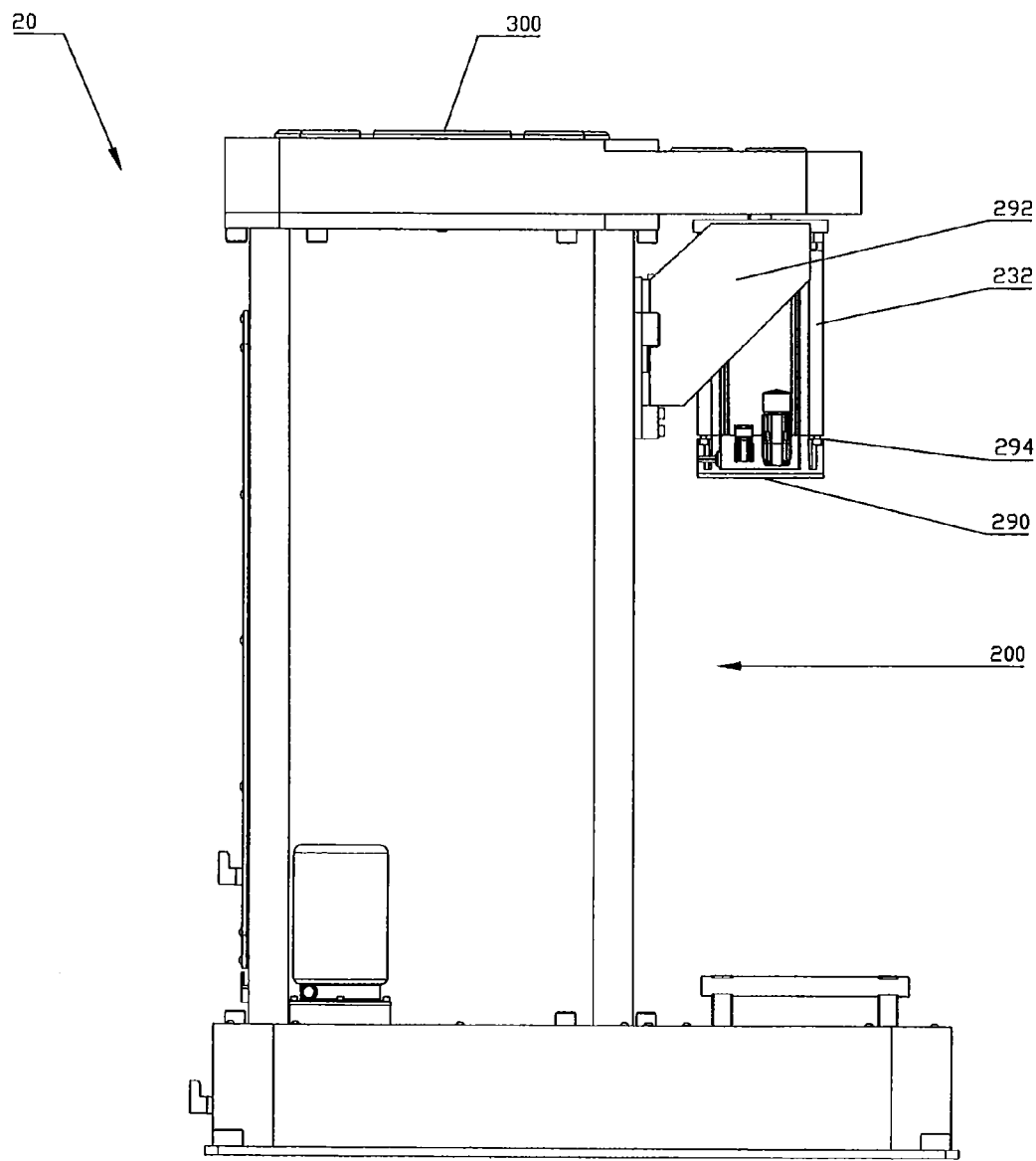
FIG. 4A illustrates a side view of an exemplary table top broaching machine.

FIG. 4A illustrates an exemplary view of the table top broaching assembly 20 where drive unit 232 and the drive unit mounting bracket 292 are positioned on a surface of the drive housing 200 and a surface of the table top 300. An exemplary view of the drive unit 232 power source connection 294 can be seen attached to an outer surface of the drive unit 232. This connection allows power to be transmitted through a standard power supply such as, but not limited to, electric and pneumatic. The power source may be directed through a standard connection in the control panel (not shown). Additionally, an exemplary view of the shaft position encoder 290 can be seen on a bottom surface of the drive unit 232. The position of the drive unit 232 and mounting bracket 292 is not exclusive to the illustration shown. The drive unit 232 and mounting bracket 292 may be in any desired position that is capable of maintaining the interconnection between the power source and the drive spindle 240. Other exemplary illustrations may include a drive unit 232 that may be directly attached to the drive spindle 240. In this alternative illustrative configuration, there may not be a need for a drive member 238 and a drive unit mounting bracket 292. However, this is merely an example of a possible configuration, and many other known configurations may be utilized for transmitting power and torque from a drive unit 232 to a drive spindle 240 (illustrated in FIG. 4B).

Figure 4B:
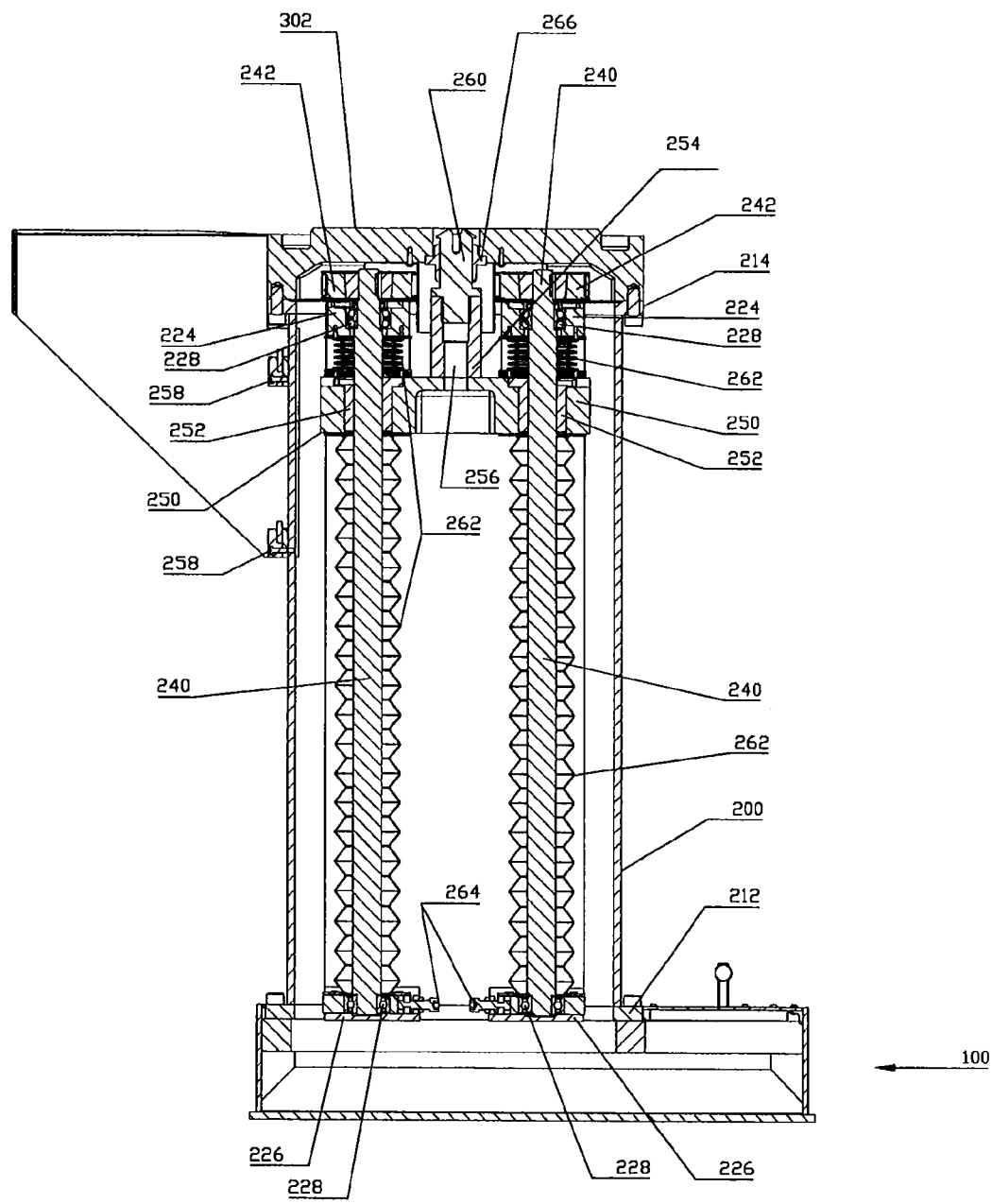
FIG. 4B illustrates a cross-sectional view of an exemplary table top broaching machine illustrating the drive spindles and drive assembly.

FIG. 4B illustrates an exemplary view of the table top broaching assembly 20 in cross-section taken vertically down the center line of the drive spindles 240 and the broaching tool puller 260. The cross-section illustrates a possible configuration where two drive spindles 240 flank the broaching tool puller 260 on adjacent sides and are positioned an equal distance from and within the drive housing 200 by the bearing blocks 224, 226. As stated above, the upper bearing block 224 and the lower bearing block 226 may be attached by any known method to the drive housing 200 at the top mounting lip 214 and the reservoir mounting lip 212. The bearing blocks 224, 226 act as a rigid member to support and position the drive spindles 240 as well as provide a housing for a bearing pack 228. The bearing packs 228 provide smooth rotation for the inserted or attached drive spindles 240. The bearing blocks 224, 226 may also provide a mounting point for at least one spindle sealing member 262.

The drive spindles 240 may be oversized to approximately forty (40) mm in diameter. The drive spindles 240 may have a shoulder that may be positioned against the bearing packs 228 while a portion of the drive spindle 240 extends within and against the internal surface of the bearing packs 228. The bearing packs 228 provide straight line positioning of the drive spindles 240 to keep the spindles 240 in a vertical position, which promotes better torque and force transmission from the drive unit 232 through the drive spindles 240 to the pull bridge 250 and the broaching tool puller 260. It should be known that the bearing packs 228 may be of any known bearing such as, but not limited to, ball bearings, needle bearings or brass bushings. The bearing packs 228 may be pressed into the bearing blocks 224, 226 and the bearing pack 228 in the lower bearing block 226 may be prohibited from rotating within the block by a set screw 264.

The drive unit 232, either directly, through the previously described pulley gears 236, 242 or indirectly with the drive member belt 238 and pulleys 236, 242, provides rotational torque to the drive spindles 240, which in turn create a straight line downward force transferred from the puller 260 and connected broach tool (not shown) to the workpiece (not shown) and table top work surface 302 (discussed in greater detail below). Therefore, the load distribution is transferred to the table top work surface 302 directly through the drive spindles 240 and torque transmitting member 252 without the addition of traditional machine ram, box way, rails, carriage, guide rods or bearing cars. This eliminates the need for a heavy machine frame, and allows for a modular design of a reservoir base 100, drive housing 200 and table top 300. The rotational torque may be transferred from the drive spindles 240 to the pull bridge 250 by any known method such as, but not limited to, a ball screw, roller, and planetary type spindles. The ball screw drive spindle 240 torque transmitting member 252 is a mechanical device for translating rotational motion to linear motion with little friction. When using a ball screw drive spindle 240 the shaft is threaded and provides a spiral raceway for torque transmitting ball bearing members 252, which act as a precision screw threading the pull bridge 250 and the puller 260 down as the drive spindles 240 rotate and the torque transmitting ball bearing members 252 are rotated. Ball screw drive spindles 240 and the associated torque transmitting member 252 are able to apply or withstand high thrust loads with minimal internal friction. The low friction in the ball screw drive member 240 and torque transmitting ball bearing 252 yields high mechanical efficiency, which results in smaller drive unit 232 to higher applied pull force ratio.

Oversizing the spindles 240 to a diameter of 40 mm or greater and the use of ball screw spindles 240 enables the table top broaching machine 20 to eliminate the use of guide rails as well as to maintain the entire drive assembly 230 below the table top 300. The elimination of guides, which control straight line movement, may decrease the drag associated with the guides as well as ultimately promote free movement of the broaching tool. This free movement may prevent premature tool wear and scrap producing part damage. The oversized ball screw spindles 240 may help to prevent deflection of the spindles 240, while providing increased strength and load distribution. The load distribution occurs as rotational torque is converted to linear force through the torque transmitting ball screw ball bearing nut 252. The nuts 252 are mounted an equidistance from the puller 260 on the pull bridge 250 and may be simultaneously rotated to maintain an equal pull force on the broaching tool. The spacing of the ball bearing nuts 252 may allow the pull bridge 250 to transmit a greater vertical straight line force into a part through the use of the smaller drive unit 232.

The sealing member 262 provides an additional barrier to protect the drive spindle 240 outer surfaces from metal chips and debris produced during the broaching process. The sealing member 262 may be sealed to both bearing blocks 224, 226 and the pull bridge 250. The sealing member 262 may be made from any resilient, pliable material capable of extending and compressing. In one exemplary approach, the drive spindle is sealed using at least one expandable and retractable baffle having top and bottom sealing surfaces. The material may be, but is not limited to, plastic, rubber, composite, bi-metal or other material capable of sealing and preventing chips, debris and coolant from entering the connection of the drive spindle 240 to the torque transmitting member 252. The sealing member 262 may be a straight or corrugated tube; however, in some applications the sealing member 262 may be perforated or a mesh to allow the liquid (not shown) to flow into and provide lubrication to the bearing packs 228. The sealing member 262 helps to provide a clean uncontaminated surface for the ball screw to work properly by assisting in keeping the threads on the drive spindle 240 clean and debris free. Where a perforated or mesh sealing member 262 is used, a separate sealing device (not shown) may be employed to keep liquid from the torque transmitting member 252 and to ensure an operationally dependable drive spindle 240 surface.

The pull bridge 250 may include a puller attachment member 254 and an aperture 256 extending therethrough. With the use of the oversized drive spindles 240 the pull bridge 250 and spindles 240 are able to operate in an environment under the table top 300. The attachment member 254, with integrated aperture 256, is threaded to accept a standard broaching tool puller 262. The aperture 256 and threadingly engaged tool puller 262 may be positioned on the exact centerline of the oversized drive spindles 240 to optimize load forces into a straight line, which eliminates stress and deflection.

FIG. 4B further illustrates an exemplary table top the broaching tool puller 260, which is shown with a release collet 266. The release collet 266 surrounds the outside of the tool puller 260 and locks or releases the broaching tool. In operation, the drive units 232 rotates to raise and lower the pull bridge 250, which in turn raises or lowers the tool puller 260. When the tool puller 260 is raised, the tool puller 260 is extended into an aperture 304 in the table top 300 and the release collet 266 contacts a recessed area 306 on the under side of the aperture 304 causing the collet 266 to compress downwardly and consequently releasing the broaching tool from the puller 260. Conversely, when the broach puller 260 is refracted down away from the table top 300 the collet 266 extends upward locking the broaching tool within the puller 260.

Additionally, when the pull bridge 250 and connected puller 260 are in an up position, with the collet 266 unlocked and broach tool ready for removal, the operator may select a teach function on the control unit. The movement of the pull bridge 250 is in either an upward or downward direction based on the rotation of the drive spindles 240 which solely guide the pull bridge 250. Movement to an up position is movement in the vertical direction towards the table top 300 and movement to a downward position is movement in the vertical direction towards reservoir base 100. When available and utilized, the quick teach button feature may adjust the stroke for the length of the broaching tool, automatically in seconds, rather than using stops and switches which do not hold up well in the under table environment. The under table environment may include, but is not limited to, metal shavings, chip debris, high heat and large amounts coolant liquid. This under table environment is not conducive for housing electronics or drive units as coolants may be conductive and inappropriate for use with electronics. Additionally, it takes several minutes of trial and error to set traditional stops. However, with a simple visual setting the stroke length is set and no data entry or measurement is required. The operator simply lowers the broach tool in a teach setup slow movement mode, and when the tool is below the table top work surface 302 part nest 308 the teach button is pushed on the control panel, allowing each stroke of the pull bridge 250 to stop at the exact spot. The control unit may be a simple push button control with simple buttons for start, stop, teach and run or the controller may be more elaborate utilizing a touch screen in place of the buttons. The touch screen may also contain controls for the auxiliary attachments such as, but not limited to, a pick and place device to manually remove the broaching tool and an automatic clamping system for the table top for rapid and repetitive manufacturing.

Figure 5A:
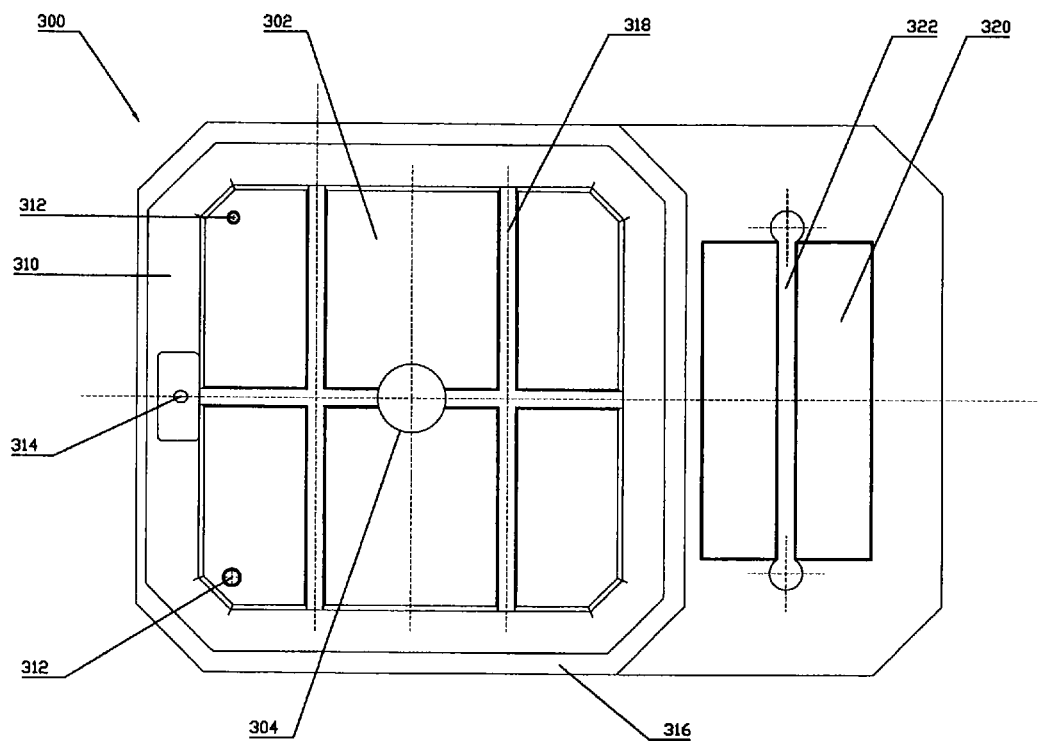
FIG. 5A illustrates a top view of an exemplary table top broaching machine table top.
Figure 5B:
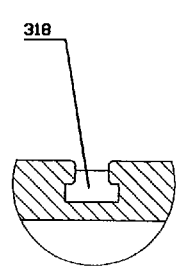
FIG. 5B illustrates an exploded cross-sectional view of an exemplary attachment groove.

FIGS. 5A-5E illustrate an exemplary table top 300. The table top 300 provides a load bearing surface that allows for any size or shaped work piece to be broached without any obstructions to the work surface while the drive mechanism is positioned completely below the table. Specifically, FIG. 5A illustrates a top view of the table top 300 illustrating the generally planar work surface end 302 and an opposite auxiliary attachment end surface 320. The generally planar work surface 302 includes a centrally located aperture 304, as discussed above, that is centered with the drive spindles 240. The work surface 302 includes attachment grooves 318 that bisect the work surface 302 providing clamping points for securing a work piece onto the table top 300 during operation. The grooves 318 may be T-slots (as best seen in FIG. 5B) for receiving a T-slot clamp; however, other known grooves and clamping devices may be used. The T-slot grooves 318 also serve as drainage grooves extending outside the work surface 302 to a reservoir 310. The reservoir 310 extends around an outer periphery of the work surface 302 providing a drainage system for the liquid coolant. The liquid coolant is supplied to the work surface 302 by fluid ports 312 that are in fluid communication with the pump 360 and reservoir base 100. The liquid coolant is returned back to the reservoir base 100 through a return drain port 314 located in the work surface reservoir 310. Additionally, a liquid and chip splash shield (not shown) may be provided to minimize debris from flowing off the table top 300.

Figure 5C:
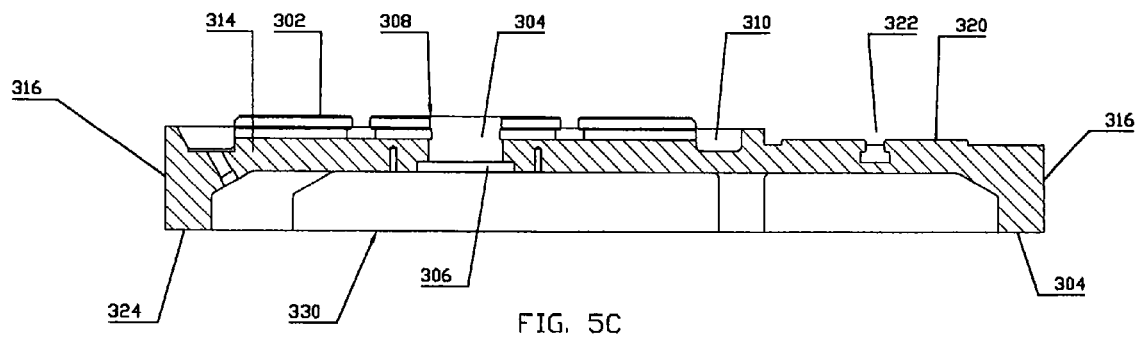
FIGS. 5C and 5D illustrate cross-sectional views of an exemplary table top broaching machine table top.
Figure 5D:
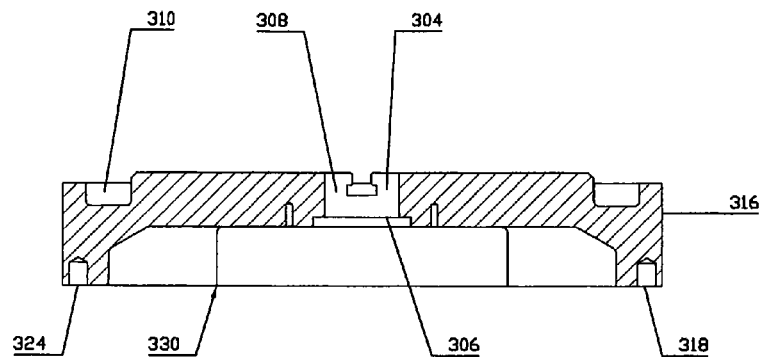

FIGS. 5C and 5D illustrate cross-sectional views taken from the X and Y axes based on the center of the aperture 304. The outer edge of table top 300 is defined by a wall 316. The wall 316 encompasses both the work surface 302 and the auxiliary mounting surface 320. The auxiliary mounting surface 320 provides a mounting groove 322, like the T-slot groove 318 of the work surface 302. The auxiliary mounting surface provides the operator the ability to add a pick and place device or a broach tool removal device. The wall 316 extends around the table top 300 and down to a mounting flange 324. The mounting flange 324 forms the connection between the table top 300 and the drive housing 200. The table top 300 can be attached to the drive housing 200 with any known mechanical method such as, but not limited to, bolts, nuts and toggles. The cross-sectional view of the table top 300 illustrates a pocket area 330 on the underside of the working surface 302. The pocket area 330 provides a cover for the rotating components of the drive mechanism 230.

Figure 5E:
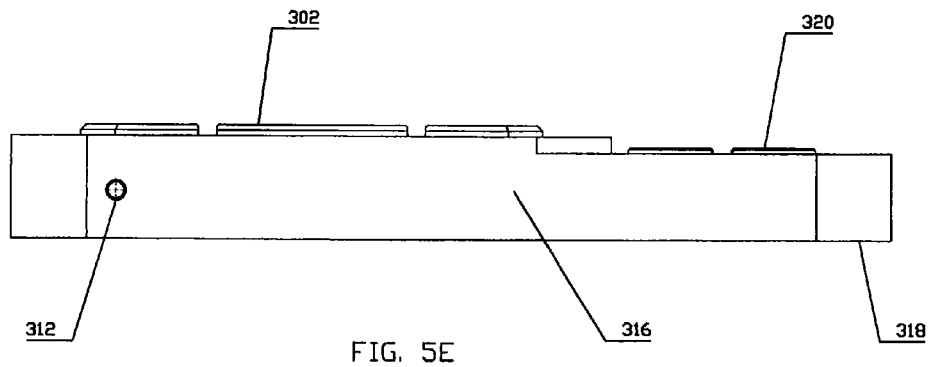
FIG. 5E illustrates a side view of an exemplary table top broaching machine, table top.

FIG. 5E illustrates an exemplary side view of the table top 300. The illustration demonstrates the generally planar work surface 302 and portion of the T-slot grooves. Additionally, the illustration demonstrates at least one fluid port 312 located on the work surface 302 surface side of the table top 300. The fluid port is in fluid communication with the reservoir base 100.

Additionally, an exemplary method for operating the table top broach machine may include, but is not limited to, the operator loading the part onto the work surface 302 that is completely clear of obstructions due to the drive assembly 230 being mounted below the table top 300; the operator hand loads the broach cutting tool or utilizes the auto loading feature controlled by the control panel; the operator selects the broach down button on the control panel, activating a light; the operator touches two hand SAFETY switches, which rotates the drive unit 232 and drive pulleys 236, 242 applying a rotational torque to the two ball screw spindles 240, force is applied to the pull bridge 256 and puller 260 causing the broach to move down cutting the part; the operator removes the part from the work surface 302; the operator selects the broach up button, activation light comes on; the operator touches both hand SAFETY switches, which rotates the drive unit 232 in a reverse direction causing the broach to move up for unloading; the operator or the automatic pick and place (not shown) device removes the broach tool, placing it in a table top holder (fishing rod type, not shown); the operator clears the work surface 302 of the part and places the next part on the work surface 302. The average cycle is 15-30 seconds operator/application dependent.

Although the method steps are listed in an exemplary order, the steps may be performed in differing orders. Furthermore, as noted above, one or more steps may be eliminated and other exemplary broaching steps may be added between the initial stage and the final stage.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A table top broach machine comprising:
a table top having an aperture therein;
at least one support member positioned below and mounted to the table top;
a drive mechanism operatively connected to at least one sealed drive spindle, wherein the drive mechanism is positioned below the table top and configured to attach to at least one of the table top and the support member, and a broach tool puller positioned below the table top and extendable through the aperture via operation of the drive mechanism; and
a base positioned below and connected to the support member, wherein the base is in fluid communication with and positioned below the table top;
wherein the base provides support of the broach machine and is removably affixed to a planar load bearing surface; and
wherein the planar load bearing surface is a floor, and wherein the base includes mounting tabs for affixing the base to the floor.

2. The table top broach machine according to claim 1, wherein the drive mechanism includes a ball screw spindle and torque transmitting ball bearing.

3. The table top broach machine according to claim 1, further comprising:
a second sealed drive spindle, wherein the drive spindles are ball-screw spindles operatively connected to at least one pull bridge.

4. The table top broach machine according to claim 1, wherein the drive spindle is sealed using a sealing member made a resilient and pliable material capable of extending and compressing.

5. The table top broach machine according to claim 1, wherein the support is an enclosure having at least one wall that is removably connected to the table top and the base.

6. The table top broach machine according to claim 1, wherein the support includes at least one stanchion extending from the base to the table top for providing support to the table top and the drive mechanism.

7. The table top broach machine according to claim 1, wherein the base is a reservoir for containing a liquid.

8. The table top broach machine according to claim 1, wherein the drive mechanism includes at least one electro-mechanical drive motor operatively connected to a pull-bridge and the broach tool puller.

9. The table top broach machine according to claim 1, further comprising: a chip funnel and a chip seal plate positioned between the table top and the enclosure.

10. The table top broach machine according to claim 1, further comprising: a control module having an integrated teach program.

11. The table top broach machine according to claim 1, further comprising:
the base connected to a drive spindle enclosure, wherein the base and drive spindle enclosure are maintained beneath the table top;
the drive mechanism attached to at least one of the drive spindle enclosure and the table top, wherein the drive spindle is at least 40 mm in diameter and the drive unit applies torque to two ball screw drive spindles of the at least one sealed drive spindle;
a drive spindle seal encasing the two ball screw drive spindles and a ball screw nut; and
a pull bridge interconnected to the two ball screw drive spindles, wherein the pull bridge transmits torque through the ball screw nuts and a force applying puller is received in the aperture that is a centrally located pull bridge aperture.

12. The table top broach machine according to claim 1, further comprising:
a table module, wherein the table module includes the table top, a side surface extending around an outer periphery of the table top and a bottom surface having a pocket and a chip funnel attached to the bottom surface and surrounding the aperture;
the drive mechanism removably connected to the table module, wherein the drive mechanism is rotatingly connected to the sealed drive spindle and a pull bridge having the puller centrally positioned and attached to a drive housing enclosure; and
a base module including the base and removably connected to the drive mechanism, wherein the base is fluidly connected to the table module through a pump.

13. The table top broach machine according to claim 12, further comprising: a reservoir around an outer periphery of a work surface having part attachment grooves, wherein the reservoir is in fluid communication with the base.

14. The table top broach machine according to claim 12, further comprising: an auxiliary attachment surface positioned adjacent a work surface on the table top.

15. The table top broach machine according to claim 12, further comprising a puller stop positioned in the pocket of the table top, around the aperture and within the chip funnel.

16. The table top broach machine according to claim 12, further comprising a drive housing table top seal plate.

17. The table top broach machine according to claim 12, wherein the drive housing is an enclosure having at least four sides.

18. The table top broach machine according to claim 12, further comprising a control panel in communication with the electro-mechanical drive unit, the drive spindles and an operator, wherein the control unit has a quick teach function for positioning the puller adjacent a work piece.

\* \* \* \* \*